United States Patent [19]
Kaminski et al.

[11] Patent Number: 5,122,563
[45] Date of Patent: * Jun. 16, 1992

[54] POLYIMIDES CURED IN THE PRESENCE OF GLASS, BORON (AMORPHOUS OR OXIDES) OR ALUMINUM OXIDES

[75] Inventors: Stanley S. Kaminski, Stamford; Andrea Leone-Bay, Ridgefield, both of Conn.

[73] Assignee: American Cyanamid Company, Stamford, Conn.

[ * ] Notice: The portion of the term of this patent subsequent to Jun. 4, 2008 has been disclaimed.

[21] Appl. No.: 636,836

[22] Filed: Jan. 2, 1991

[51] Int. Cl.⁵ .............................................. C08K 3/38
[52] U.S. Cl. .................................. 524/405; 524/430; 524/494
[58] Field of Search .................... 524/405, 430, 494

[56] References Cited

U.S. PATENT DOCUMENTS 4,384,071  5/1983  Nimry et al. ..................... 524/494
5,021,540  6/1991  Leone-Bay et al. ................ 528/183

FOREIGN PATENT DOCUMENTS 63-193935  8/1988  Japan ..................... 524/430

Primary Examiner—Paul R. Michl
Assistant Examiner—John J. Guariello
Attorney, Agent, or Firm—Frank M. Van Riet

[57] ABSTRACT

Polyimides with elevated Tg's are made by imidization of the product of reaction of dianhydrides with diaminobenzotrifluoride and bis(trifluoromethyl) oxydianilines when glass, boron, boron oxides, aluminum oxides or mixtures thereof are incorporated therein.

22 Claims, No Drawings

POLYIMIDES CURED IN THE PRESENCE OF GLASS, BORON (AMORPHOUS OR OXIDES) OR ALUMINUM OXIDES

FIELD OF THE INVENTION

The present invention relates to novel polyimide compositions useful for making composites and adhesives and, more particularly, to polyimides made from the product of condensation of an aromatic dianhydride (or a corresponding acid-ester or tetracarboxylic acid) and an aromatic diamine which has at least one trifluoromethyl radical attached to an aromatic ring into which have been introduced glass, boron, aluminum oxides, boron oxide and mixtures thereof.

BACKGROUND OF THE INVENTION

It is known to make polyimides by thermal imidization of the intermediate polyamic acid obtained by reaction of a dianhydride (or a corresponding acid-ester or tetracarboxylic acid) and a diamine. Polyimides from the product of reaction of 3,5-diaminobenzotrifluoride and dianhydrides (or corresponding esters or acids) were described in U.S. Pat. No. 4,876,329. Only the diamine-dianhydride reaction products and imides made from those reaction products were described.

Commonly assigned U.S. Ser. No. 07/584,561 discloses polyimides made from the product of condensation of an aromatic dianhydride (or corresponding acid-ester or polycarboxylic acid) and an aromatic diamine which has at least one trifluoromethyl radical attached to the aromatic ring. It has now been discovered that through the addition of glass, boron, aluminum oxides and mixtures thereof in the form of particulates into the polyimides described above, resins having markedly increased Tg's may be obtained.

SUMMARY OF THE INVENTION

The present invention provides novel polyimide resin compositions made from the reaction products of dianhydrides and diamines having two aminobenzotrifluoride radicals into which have been introduced glass, boron, aluminum oxide, boron oxide and mixtures thereof. The invention further provides polyimide resins made from the product from reaction of a dianhydride with a diaminobenzotrifluoride or a diamine having two aminobenzotrifluoride radicals and which have been end-capped by reaction of the diamine-dianhydride reaction product with a monoamine or a monoanhydride into which said materials have been introduced. The end caps of said compositions, if present, may be either reactive or non-reactive.

In one embodiment of the invention, end-capped polyimide resins from the reaction products of 3,5-diaminobenzotrifluoride and dianhydrides (or corresponding ester or acid) are produced.

In another embodiment of the invention, novel polyimide resins by reaction of dianhydrides with diamines which have two aminobenzotrifluoride moieties in the molecule, including such resins which have been end-capped by further reaction with a monoamine or a monoanhydride.

DESCRIPTION OF THE INVENTION

The compositions of the present invention also comprise glass, aluminum oxide boron oxide, amphorous boron and mixtures thereof, (which shall hereinafter be referred to as "Fillers"). Such Fillers are utilized in particulate form. Preferably, said Filler is present as particles ranging in average size from about 0.01μ to about 10μ. More preferably, the Filler is present as particles ranging in average size from about 0.05μ to about 1.0μ.

The thermosetting resins of the present invention produce cured polyimides having excellent stability at high temperatures. These are especially useful for making composites and adhesives for high temperature applications. Moreover, the presence of the Fillers therein, has been found to lead to the production of polyimides having unexpectedly high glass transition temperatures (Tg).

Diamines used for making polyimides of the invention are:

1. diaminobenzotrifluorides, such as 3,5-diaminobenzotrifluoride (3F) of the formula

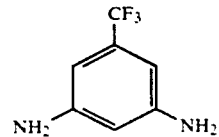

and isomer thereof, and 2. bis (trifluoromethyl) oxydianilines such as 4,4'-(2,2'-bistrifluoromethyl) oxydianiline (FOD) which has the structural formula

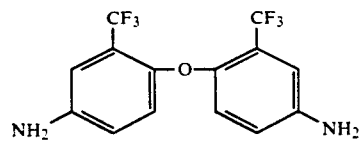

and its isomers.

This diamine (FOD) was described as an intermediate in the synthesis of diisocyanates, by Maki, Y. and Inukai, K. at Nippon Kagaku Kaishi (3), 675-7 (Japan) 1972. See Chem. Abstracts 77 (9): 61435 g. Three isomeric bis(trifluoromethyl dinitrophenyl) ethers were obtained by reaction of chloronitrobenzotrifluorides with alkali metal carbonates. The dinitro-compounds were reduced by Sn—HCl to make the diamines.

Dianhydrides useful for making polyimides of the invention are dianhydrides having at least one aromatic ring in the molecule. Some preferred dianhydrides of this class are:

3,3',4,4'-benzophenone tetracarboxylic dianhydride (BTDA),
pyromellitic dianhydride (PMDA),
2,2'-bis(3,4-dicarboxyphenyl)-hexafluoropropane dianhydride (6F),
3,3',4,4'-sulfonyldiphthalic anhydride (DPSA),
3,3',4,4-diphenyl dianhydride (BPTDA),
oxydiphthalic anhydride (ODPA), and similar dianhydrides.

The general reactions of diamines with dianhydrides, or with diesterdiacids, to make linear polyimides are known and need not be described in detail here. In the direct reaction of diamine and dianhydride, a polyamic acid intermediate is formed, and the intermediate proceeds by imidization when heated to form the polyimide. In another reaction scheme, the anhydride is opened by hydration or partial esterification to form intermediates which are then reacted with the diamine to form the intermediate and then the polyimide. The descriptions and definitions herein of polyimides made from the reaction product of a diamine and a dianhydride include within their scope polyimides of the same composition which may be made from the product from reaction of the same diamine with a diester diacid or a poly carboxylic acid (e.g. tetraocid derivative) which corresponds to the same dianhydride.

The claimed diamines may further contain end caps although their presence is not mandatory. All endcaps known in the polyimide art may be utilized.

Preferably, if such endcaps are present, they are selected from the group consisting of phtallic anhydride, para-amino styrene, para-amino stilbene and nadic anhydride. If present, they may generally be present in amounts ranging from about 1% to about 50% based upon the other backbone monomers.

The Fillers may generally be present in amounts ranging from about 0.05 to about 20 wt. % based upon the total weight of the resin. Preferably, said Filler is present in amounts ranging from about 0.1 to about 10 wt. % on the same basis. Most preferably, Filler is present in amounts ranging from about 0.2-5 wt % on the same basis.

The Fillers must be included in the balance of the resin composition prior to its cure. While they may be included prior to imidization of the resin, this is not necessary.

The presence of the Filler within the claimed resin composition have been found to substantially increase the glass transition temperature (Tg) of the resin composition relative to a resin composition not containing said Filler. While not wishing to be bound by the following theory, Applicants believe that the observed increase in Tg may be due to increased crosslink density of the polymer.

The invention will be described in more detail below by reference to specific examples, which should not be construed as limiting the intended scope of the present invention.

EXAMPLES

Definitions

"BTDA" shall mean 3,3',4,4'-benzophenone retracarboxylic dianhydride.
"BPTDA" shall mean 3,3',4,4'-diphenyl dianhydride.
"124" shall mean 4,4'-(2,2'-bistrifluoromethyl) oxydianiline.
"PA" shall mean phtallic anhydride.
"6F" shall mean 2,2'-bis(3,4-dicarboxyphenyl)-hexafluoropropane diahydride.
"PAS" shall mean para-amino styrene.
"PAST" shall mean para-amino stilbene.
"PMDA" shall mean pyromellitic dianhydride.
"PMDE" shall mean diester-diacid of PMDA.
"NA" shall mean nadic anhydride.
"3F" shall mean 3,5-diaminobenzotrifluoride.
"CARDO" shall mean

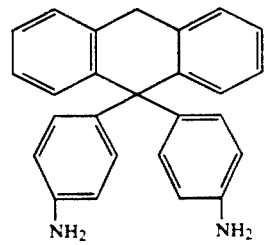

EXAMPLE 1

Preparation of 6F/3F/NA

A mixture of 6F (4.1 g, 9.17 mM), 3F (2.4 g, 13.8 mM) and N-methylpyrrolidinone (15 mL) was heated to 80°-100° C. over a period of about 15 minutes with stirring. To the resulting golden solution was added NA (1.5 g, 9.17 mM). The reaction mixture was stirred until a solution was obtained. A specific amount of amphorous boron powder (obtained from Johnson Matthey, submicron size, lot D 09A63) was introduced into the solution with stirring. After cooling to room temperature, the solution (~1 mL) was coated onto Celion® 3k70P tape (1 ply). The coated tapes were dried at 200° C. in air circulating oven for 1-2 hours, then cured at 371° C. for 2 hours in an air atmosphere. Tg's were then determined in accordance with the procedures previously set forth herein.

Measurement of Tg (tan delta and 5% offset).

The cured resin-coated glass tapes are cut to a length of 31.8 mm and Dynamic Mechanical Analyses (DMA) are performed on each sample to determine the resin's glass transition temperatures (tan delta and 5% offset). The DuPont 982 DMA was used with horizontal grips at a test span of 16.5 mm, an oscillation amplitude of 0.1 mm and a heating rate of 10° C./min.

EXAMPLE 2

Preparation of BTDA/124/PA

The procedure of Example 1 was followed using BTDA (5.0 g, 15.5 mM), 124 (5.4 g., 16.2 mM) and PA (96 mg., 0.6 mM).

Tg data were then determined in accordance with the procedures previously set forth herein.

EXAMPLE 3

Preparation of BPTDA/124/PA

The procedure of Example 1 was followed using BPTDA (5.0 g, 1.70 mM), 124 (5.9 g., 1.77 mM) and PA (100 mg., 0.7 mM).

Tg data were then determined in accordance with the procedures set forth herein.

EXAMPLE 4

Preparation of 6F/124/PA

The procedure of Example 1 was followed using 6F (5.0 g., 11.3 mM), 124 (4.0 g., 11.8 mM) and PA (83 mg., 0.57 mM).

Tg data were then determined in accordance with the procedures set forth herein.

EXAMPLE 5

Preparation of 6F/124/PAS

The procedure of Example 1 was followed using 6F (1.4 g., 3.13 mM), 124 (706 mg., 2.10 mM) and PAS (250 mg., 2.10 mM).

Tg data were then determined in accordance with the procedure set forth herein.

EXAMPLE 6

Preparation of 6F/124/PAST

The procedure of Example 1 was followed using 6F (1.4 g., 3.13 mM), 124 (706 mg., 2.10 mM) and PAST (410 g., 2.10 mM).

Tg data were then determined in accordance with the procedures set forth herein.

EXAMPLE 7

Preparation of PMDA/3F/PA

The procedure of Example 1 was followed using PMDA (2.0 g., 9.17 mM), 3F (1.65 g. 940 mM), NMP (15mL) and PA (68 mg. 0.46 mM).

Tg data were then determined in accordance with the procedures set forth herein.

EXAMPLE 8

Preparation of PMDE/3F/PA

The procedure of Example 1 was followed using PMDE (2.1 g., 9.17 mM), 3F (1.65 g., 940 mM) and PA (68 mg., 0.46 mM).

Tg data were then determined in accordance with the procedures set forth herein.

EXAMPLE 9

Preparation of 6F/CARDO/PA

The procedure of Example 1 was followed using 6F (1 g g., 2.25 mM), CARDO (825 mg., 2.37 mM) and PA (35 mg., 0.24 mM).

Tg data were then determined in accordance with the procedures set forth herein.

The data gathered in Examples 1-9 is set forth in Table 1.

TABLE 1

| Example # | Tg. °C. (tan &/5% off) | | | 5.0% Boron |
|---|---|---|---|---|
| | 0% Boron | 0.2% Boron | 2.0% Boron | |
| 1 | | | | |
| 2 | 285/256 | 417/322 | — | 361/330 |
| 3 | 293/261 | 414/307 | 399/348 | — |
| 4 | 288/261 | 320/307 | 353/319 | — |
| 5 | 366/290 | 446/389 | 441/415 | — |
| 6 | 331/253 | — | 437/320 | — |
| 7 | 398/368 | — | 429/387 | — |
| 8 | 394/339 | 419/353 | 461/407 | — |
| 9 | 353/326 | — | 354/328 | — |

We claim:

1. A polyimide resin comprising a particulate solid selected from the group consisting of glass, boron, boron oxide, aluminum oxide and mixtures thereof and the reaction product of a dianhydride (or its diester or tetracid derivative) having at least one aromatic ring in the molecule and a bis(trifluoromethyl) oxydianiline.

2. A polyimide resin defined by claim 1 wherein the bis(trifluoromethyl) oxydianiline is 4,4'(2,2'trifluoromethyl) oxydianiline.

3. A polyimide resin comprising a particulate solid selected from the group consisting of glass, boron, boron oxide, aluminum oxide and mixtures thereof and the reaction product of a dianhydride having at least one aromatic ring in the molecule and an excess of a diamine selected from the group consisting of diaminobenzotrifluorides and bis (trifluoromethyl) oxydianilines, and end capped by reaction with a monoanhydride.

4. A polyimide resin comprising a particulate solid selected from the group consisting of glass, boron, boron oxide, aluminum oxide and mixtures thereof and the reaction product of an excess of a dianhydride having at least one aromatic ring in the molecule and a diamine selected from the group consisting of diaminobenzotrifluorides and bis (trifluoromethyl) oxydianilines, and end capped by reaction with a monoamine.

5. A polyimide resin defined by claim 3 wherein the monoanhydride is a member selected from nadic anhydride and phthalic anhydride.

6. A polyimide resin defined by claim 4 wherein the monoamine is a member selected from the group consisting of p-aminostyrene, p-aminostilbene and 2-amino-4,5-dicyanoimidazole.

7. A polyimide resin defined by claim 3 wherein the selected diamine is a bis (trifluoromethyl) oxydianiline.

8. A polyimide resin defined by claim 3 wherein the selected diamine is a diaminobenzotrifluoride.

9. A polyimide resin defined by claim 7 wherein the selected diamine is 4,4'(2,2'bistrifluoromethyl) oxydianiline.

10. A polyimide resin defined by claim 8 wherein the selected diamine is 3,5-diamino benzotrifluoride.

11. A polyimide resin defined by claim 2 wherein the dianhydride is a member selected from the group consisting of pyromellitic dianhydride, 2,2-bis(3,4-dicarboxyphenyl) hexafluoropropane dianhydride, 3,3',4,4'-benzophenone tetracarboxylic dianhydride, 3.3',4,4'oxydiphthalic anhydride, 3,3',4,4'-diphenyl tetracarboxylic dianhydride, and 3,3',4,4'-sulfonyldiphthalic anhydride.

12. A polyimide resin defined by claim 3 wherein the dianhydride is a member selected from the group consisting of pyromellitic dianhydride, 2,2-bis(3,4-dicarboxyphenyl) hexafluoropropane dianhydride, 3,3',4,4'-benzophenone tetracarboxylic dianhydride, 3,3',4,4'oxydiphthalic anhydride, 3,3',4,4'-diphenyl tetracarboxylic dianhydride, and 3,3',4,4'-sulfonyldiphthalic anhydride.

13. A polyimide resin defined by claim 4 wherein the dianhydride is a member selected from the group consisting of pyromellitic dianhydride, 2,2-bis(3,4-dicarboxyphenyl) hexafluoropropane dianhydride, 3,3',4,4'-benzophenone tetracarboxylic dianhydride, 3,3',4,4'oxydiphthalic anhydride, 3,3',4,4'-diphenyl tetracarboxylic dianhydride, and 3,3',4,4'-sulfonyldiphthalic anhydride.

14. A polyimide resin defined by claim 12 wherein the monoanhydride is selected from nadic anhydride and phthalic anhydride.

15. A polyimide resin defined by claim 13 wherein the monoamine is selected from p-amino styrene, p-amino stilbene, and 2-amino-4,5-dicyanoimidazole.

16. A polyimide resin defined by claim 12 wherein the selected diamine is 4,4'(2,2'bistrifluoromethyl) oxydianiline.

17. A polyimide resin defined by claim 13 wherein the selected diamine is 3,5-diamino benzotrifluoride.

18. A polyimide resin defined by claim 14 wherein the selected diamine is 4,4'(2,2'bistrifluoromethyl) oxydianiline.

19. A polyimide resin defined by claim 15 wherein the selected diamine is 3,5-diamino benzotrifluoride.

20. A polyimide resin defined by claim 1 wherein the particulate solid is boron.

21. A polyimide resin defined by claim 1 wherein the particulate solid has an average particle size ranging from about $0.01\mu$ to about $10\mu$.

22. A polyimide resin defined by claim 21 wherein the particulate solid has an average particle size ranging from about $0.05\mu$ to about $1.0\mu$.

* * * * *